United States Patent
Cho

(10) Patent No.: US 11,613,250 B2
(45) Date of Patent: Mar. 28, 2023

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Dae Gil Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 236 days.

(21) Appl. No.: 16/719,393

(22) Filed: Dec. 18, 2019

(65) Prior Publication Data
US 2020/0207334 A1 Jul. 2, 2020

(30) Foreign Application Priority Data
Dec. 27, 2018 (KR) .................. 10-2018-0170715

(51) Int. Cl.
*B60W 30/06* (2006.01)
*G05D 1/02* (2020.01)
*G08G 1/14* (2006.01)

(52) U.S. Cl.
CPC .......... *B60W 30/06* (2013.01); *G05D 1/0251* (2013.01); *G08G 1/143* (2013.01)

(58) Field of Classification Search
CPC ............. B60W 30/06; B60W 30/181; B60W 2520/04; B60W 2556/45; G05D 1/0251; G08G 1/143; G08G 1/168; G08G 1/096811; G08G 1/146; G08G 1/096725; G08G 1/096805; G08G 1/148; G06K 9/00812; G06K 9/00771; B62D 15/0285; B60Y 2300/06

USPC ...................................... 701/23–27
See application file for complete search history.

(56) References Cited

U.S. PATENT DOCUMENTS

| | | | |
|---|---|---|---|
| 2010/0156672 A1 | 6/2010 | Yoo et al. | |
| 2012/0188100 A1 | 7/2012 | Min et al. | |
| 2014/0035526 A1* | 2/2014 | Tripathi | B60L 53/126 320/109 |
| 2014/0213176 A1* | 7/2014 | Mendelson | G01S 5/04 455/39 |

(Continued)

FOREIGN PATENT DOCUMENTS

| | | |
|---|---|---|
| CN | 103944967 A | 7/2014 |
| CN | 106646570 A | 5/2017 |
| CN | 108891412 A | 11/2018 |

OTHER PUBLICATIONS

European Search Report for European Application No. EP19219858 dated Apr. 28, 2020 (11 pgs).

(Continued)

*Primary Examiner* — B M M Hannan
(74) *Attorney, Agent, or Firm* — Fox Rothschild LLP

(57) ABSTRACT

A system, method, infrastructure, and vehicle for supporting automated valet parking are provided. The automated valet parking method may include: establishing, by a vehicle, a communication with an infrastructure facility; receiving, by the vehicle, a target position and a guide route from the infrastructure facility after the communication is established; performing, by the vehicle, an autonomous driving based on the guide route; and parking, by the vehicle, at the target position.

17 Claims, 10 Drawing Sheets

(56) References Cited

U.S. PATENT DOCUMENTS

| | | | |
|---|---|---|---|
| 2015/0279210 A1 | 10/2015 | Zafiroglu et al. | |
| 2016/0066127 A1* | 3/2016 | Choi | H04W 4/80 |
| | | | 455/41.2 |
| 2016/0203650 A1* | 7/2016 | Stanford | G07B 15/02 |
| | | | 705/13 |
| 2017/0032583 A1* | 2/2017 | Moran | H04N 5/247 |
| 2017/0092130 A1* | 3/2017 | Bostick | G08G 1/144 |
| 2017/0148325 A1 | 5/2017 | Schoenherr et al. | |
| 2017/0278394 A1 | 9/2017 | Fuehrer | |
| 2017/0313305 A1 | 11/2017 | Irion et al. | |
| 2017/0329346 A1* | 11/2017 | Latotzki | G05D 1/0088 |
| 2017/0351267 A1* | 12/2017 | Mielenz | G05D 1/0289 |
| 2017/0352200 A1* | 12/2017 | Wang | H04W 4/44 |
| 2018/0066755 A1* | 3/2018 | Kimura | F16H 61/12 |
| 2018/0075670 A1* | 3/2018 | Rajakondala | H04W 4/029 |
| 2018/0114437 A1* | 4/2018 | Singh | G08G 1/0175 |
| 2018/0315313 A1* | 11/2018 | Klochikhin | H04W 4/02 |
| 2019/0066502 A1* | 2/2019 | Du | G08G 1/096827 |
| 2019/0135279 A1* | 5/2019 | Irie | B60W 30/10 |
| 2019/0171209 A1* | 6/2019 | Lee | G08G 1/168 |
| 2020/0198620 A1* | 6/2020 | Nakata | H04W 4/024 |
| 2020/0234593 A1* | 7/2020 | Mergenthaler | G08G 1/146 |
| 2020/0272950 A1* | 8/2020 | Xu | G06Q 10/06314 |
| 2021/0061264 A1* | 3/2021 | Stefan | B60W 60/00184 |
| 2021/0180954 A1* | 6/2021 | Hiyokawa | G06V 10/48 |

OTHER PUBLICATIONS

European Search Report issued Jun. 24, 2022 in European Application No. EP 22 16 5471.
Office Action dated Aug. 2, 2022 in Chinese Application No. 201911336276.6.

* cited by examiner

FIG. 4A

| Step | Infra | Vehicle |
|---|---|---|
| <1> AVPS START | * Recognize and qualify an appropriate user (by user ID and PW) and vehicle (by unique number assigned to vehicle)<br>* Manage driving authority (receiving driving authority from the user/return the driving authority to the user<br>* Transmit automated driving start instruction to vehicle | * perform engine ON/OFF or power ON/OFF according to the instruction of infra<br>* Lock the vehicle according to the instruction of infra |
| <2> DETERMINATION OF TARGET POSITION AND GUIDE ROUTE | * Determine the target position, guide route, and permissive driving area, and deliver those information to vehicle | |
| <3> AUTONOMOUS DRIVING | * Instruct automated driving (start, stop, re-start) to vehicle | * Drive along the guide route designated by infra within the permitted driving area at a speed of 10km/h or less<br>* Drive within the path and width designated by infra without deviation<br>* Drive along a curve with the minimum inner radius of the vent designated by the infra without deviation<br>* Drive on a path with the gradient less than or equal to the maximum gradient designated by infra |
| <4> POSITION MEASUREMENT (vehicle, obstacle) | * Be aware of and manage vehicle location<br>* Detect and recognize vehicles and obstacles (TBD), and monitor safety driving and parking operation of each vehicle (supervise) | * Estimate its own position<br>* Inform the infra of its estimated position / with the accuracy and frequency specified below (TBD)<br>* Inform the infra of its own status<br>* Detect the following obstacles (TBD) |
| <5> AUTONOMOUS PARKING | | * Park and Stop the vehicle at the target position designated by infra (equivalent to PAPS parking requirements) |

FIG. 4B

| Step | Infra | Vehicle |
|---|---|---|
| <6> EMERGENCY BRAKE | * Continue to instruct automated driving to vehicle when safety is ensured as a result of safety confirmation, and to instruct the vehicle to perform an emergency stop, if safety is not confirmed | * Start/emergency stop/re-start automated driving according to the instruction of infra<br>* perform an emergency stop in case where a potential hazard is determined as a result of the detection mentioned above<br>* Immediately decelerate at the rate of (TBD) m/s and stop, when the following conditions are met<br>(1) vehicle received an instruction from infra for E/S<br>(2) vehicle detected an obstacle (TBD)<br>* After coming to a stop, the vehicle shall remain stopped until it receives an instruction from infra to resume automated driving<br>* Vehicle shall re-start suspended driving or parking when it receives an instruction to start automated driving from the infra after confirming that there is no obstacle ahead in the path |
| <7> AVPS END | *After the vehicle completes automated driving and parking, the infra transmits Vehicle control release instruction to the vehicle | * Perfrom engine ON/OFF or power ON/OFF according to the instruction of infra<br>* Lock the cenicle according to the instruction of infra<br>* Mechanically fix or restrain wheels using such as the parking brake |
| <8> FAULT CONTROL (communication or vehicle fault) | * Detect communication faults between the infra and vehicle | * Detect faults in communication with infra during driving<br>* Detect vehicle's faults (e.g. part failure, human or animal remaining inside the vehicle, etc.)<br>* Perfrom emergency stop when above fault is detected<br>* After coming to a stop, the vehicle shall remain stopped until it receives an instruction from infra to resume automated driving |

FIG. 5

| DATA | Contents | Transmit (T)/Receive (R) | | Regularity(F)/Event(E) Transmission | Note |
|---|---|---|---|---|---|
| | | Infrastructure | Vehicle | | |
| (1) Vehicle qualification information | ID number (VIN) to identify each vehicle | R | T | E When entering the parking | |
| (2) Automated driving preparation instruction | - | T | R | E Right before automated driving start | |
| (3) Vehicle information notification | Vehicle state (normal stop/driving/emergency stop, etc.) Vehicle position[should] | R | T | F (1 Hz) | This is also used for communication fault check by the vehicle |
| (4) Vehicle information response | - | T | R | F (1 Hz) | |
| (5) Target position + passing point location/Permitted time to pass through the point Maximum speed | | T | R | E After automated driving instruction | |
| (6) Driving boundaries delivery | A group of lines to surround the permitted driving area | T | R | E after automated driving preparation instruction | |
| (7) Automated driving start instruction | - | T | R | E After delivery of guide route and driving boundaries, when restarting after emergency stop | |
| (8) Emergency stop instruction | - | T | R | E | |
| (9) Vehicle control release instruction | - | T | R | E | |

SYSTEM, METHOD, INFRASTRUCTURE, AND VEHICLE FOR AUTOMATED VALET PARKING

CROSS-REFERENCE TO RELATED APPLICATION

The present application claims priority to and the benefit of Korean Patent Application No. 10-2018-0170715, filed Dec. 27, 2018, which is incorporated herein by reference in its entirety.

TECHNICAL FIELD

The present disclosure relates to a system, method, infrastructure, and vehicle for supporting automated valet parking. More particularly, the present disclosure relates to an automated parking system capable of transporting a vehicle to a vacant parking slot without a driver seated in the vehicle with help of technology of communication between the vehicle and an automated valet parking infrastructure. The present disclosure relates to an automated parking system transporting a vehicle parted at a parking slot to a pickup area without a driver seated in the vehicle with help of technology of communication between the vehicle and an automated valet parking infrastructure.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as large shopping centers, it takes long time and much energy to park a car due to traffic congestion before entering a parking lot. In addition, it takes long time and much energy to locate a vacant parking slot even after entering a parking lot. In addition, there is inconvenience that a driver has to walk to a spot at which his or her vehicle is parked when leaving the visited area.

SUMMARY

The present disclosure has been made in view of the problems occurring in the related art and an objective of the present disclosure is to provide an autonomous valet parking system in which a vehicle autonomously travels to and parks in a vacant parking slot after the vehicle stops in a drop-off area of a parking lot and the driver exits the vehicle.

Another objective of the present disclosure is to provide an automated valet parking method in which when a driver claims a vehicle to leave a visited area, the vehicle that is parked in a parking slot autonomously moves to a pickup area so that the driver gets in the vehicle in the pickup area to exit a parking lot.

According to an form of the present disclosure, there is provided an automated valet parking method including: by an infrastructure facility, establishing communication with a vehicle; by the vehicle, receiving a target position and a guide route from the infrastructure facility after the communication is established; by the vehicle, performing autonomous driving on the basis the guide route; and, by the vehicle, performing autonomous parking in the target position.

According to an form of the present disclosure, there is provided an automated valet parking method including: by an infrastructure facility, establishing communication with a vehicle; transmitting, by the infrastructure, a target position and a guide route to the vehicle after the communication is established; by the vehicle, performing autonomous driving and autonomous parking according to the guide route and the target position; and receiving, by the infrastructure facility, a notification that the autonomous parking is completed from the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are block diagrams illustrating an automated valet parking operation performed by an automated valet parking infrastructure and a vehicle in one form of the present disclosure;

FIG. 5 is a view illustrating a communication process performed by an automated valet parking infrastructure and a vehicle in one form of the present disclosure;

Figure 1:
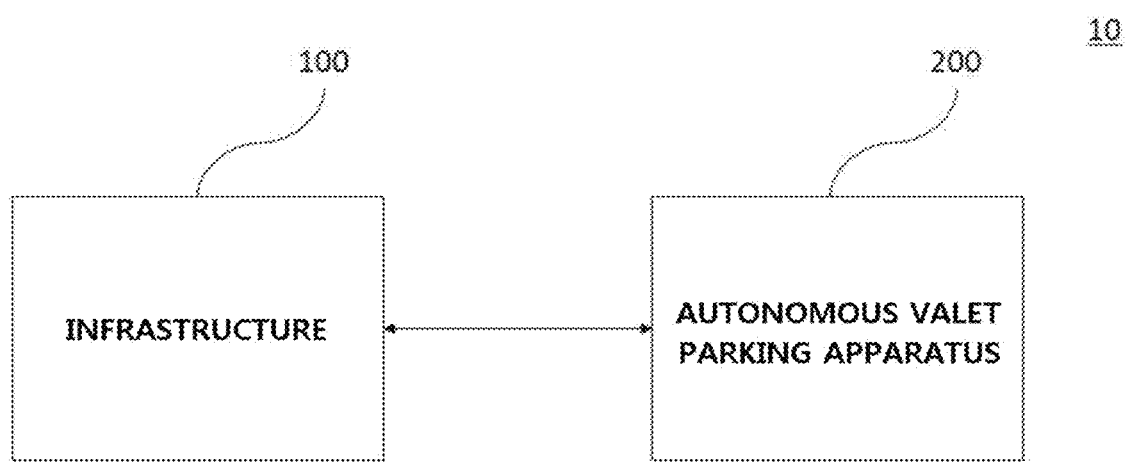
FIG. 1 is a view illustrating an automated valet parking system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, some forms of the present disclosure will be described in detail with reference to the accompanying drawings. The construction and operational effect of the present disclosure will be clearly understood from the following detailed description. Prior to describing some forms in detail, it is noted that throughout the drawing the same components will be denoted by the same reference numerals as much as possible and a detailed description about existing components and functions is omitted when the subject matter of the present disclosure may be obscured by the description.

It is also noted that terms used in the detailed description of the disclosure are defined below.

The term "driver" refers to a person who uses a vehicle and is serviced by an automated valet parking system.

The term "driving authority" refers to the authority to execute a vehicle operation. The term "vehicle operation" refers to an operation such as steering, acceleration, braking, gear shifting, engine starting or stopping, and locking/unlocking of a vehicle door.

The term "vehicle" refers to a vehicle having an autonomous valet parking function.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure facility" refers to a parking facility or a sensor installed in the parking facility. Alternatively, the term "infrastructure" may refer to a control center that controls an entrance gate of a parking lot, vehicles, etc.

The term "target position" refers to a vacant parking slot available for parking of a vehicle. Alternatively, the term "target position" refers to a pickup area where a driver can get in his or her vehicle when the driver wants to leave the parking lot.

The term "guide route" may refer to a route along which a vehicle travels to reach a target position. At the time of parking, the guide route may refer to a driving path from a drop-off area to a vacant parking slot. For example, the guide route may be expressed in the form of instructions such as driving straight ahead 50 m and turning left at the corner".

The term "driving route" refers to a driving path along which a vehicle travels.

The term "permitted driving area" refers to an area where driving of a vehicle is allowed. For example, the permitted driving area include the driving route in the parking lot. The permitted driving area is defined by barriers, parked vehicles, parking lines, etc.

FIG. 1 is a view illustrating an automated valet parking system in some forms of the present disclosure. Referring to FIG. 1, an automated valet parking system 10 includes an infrastructure facility 100 for parking and an automated valet parking apparatus 200.

The infrastructure facility 100 refers to a facility or system for operating, managing, and controlling an automated valet parking system. For example, the infrastructure facility 100 may be a parking facility. In some forms of the present disclosure, the infrastructure facility 100 includes sensors, a communication device, an alarming device, a display device, and a server device for controlling those devices. Alternatively, the term "infrastructure facility" may refer to a control center that controls an entrance gate of a parking lot, vehicles, etc.

The infrastructure facility 100 may include a communication circuit configured to perform a communication and a processor configured to determine or operate. In some forms of the present disclosure, the infrastructure facility 100 may further includes a sensor configured to sense or monitor the infrastructure facility 100. The operations or determination performed by the infrastructure facility 100 may be performed by the processor included in the infrastructure facility 100.

The automated valet parking apparatus 200 may refer to a vehicle that performs autonomous valet parking. In some forms of the present disclosure, the automated valet parking apparatus 200 may refer to a component or a set of components required to enable autonomous valet parking.

Figure 2:
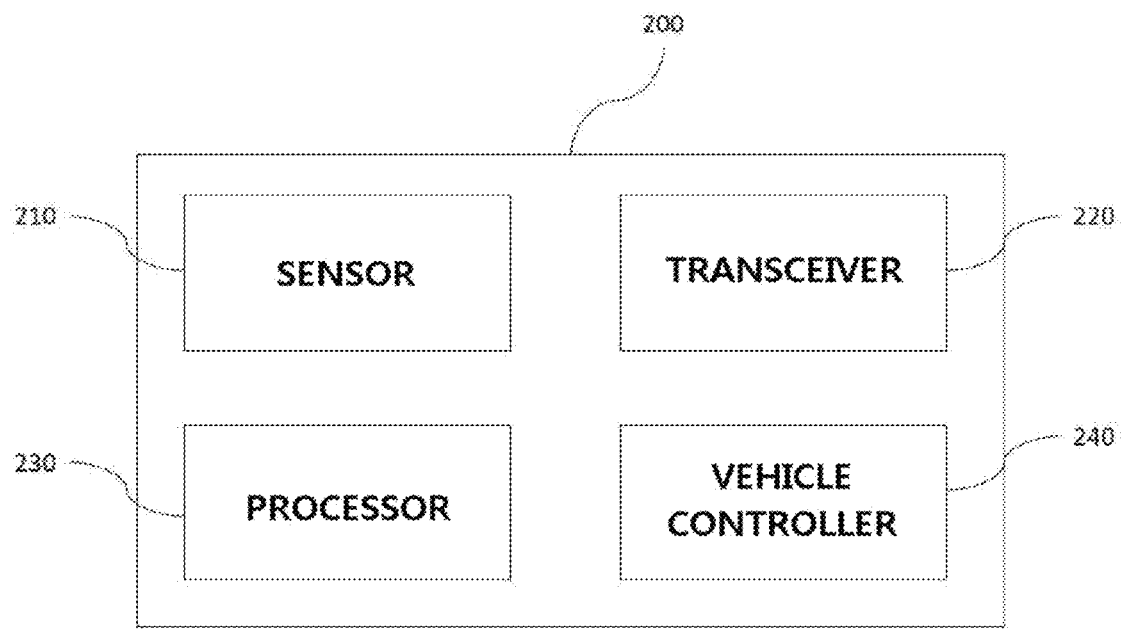
FIG. 2 is a view illustrating an automated valet parking apparatus in one form of the present disclosure.

FIG. 2 is a view illustrating an automated valet parking apparatus in some forms of the present disclosure. Referring to FIG. 2, the automated valet parking apparatus 200 (for example, vehicle) includes a sensor 210, a transceiver 220, a processor 230, and a vehicle controller 240.

The sensor 210 senses parameters of a surrounding environment of the automated valet parking apparatus 200. In some forms of the present disclosure, the sensor 210 measures the distance between the automated valet parking apparatus 200 and a specific object or detects an object present around the automated valet parking apparatus 200. For example, the sensor 210 includes at least one-type of sensor selected from among an ultrasonic sensor, a radar sensor, a lidar sensor, a camera, an infrared sensor, a thermal sensor, a millimeter wave sensor, and a GPS receiver.

The sensor 210 transmits data that is the detection results of the sensor 210 to the transceiver 220 or the vehicle controller 240.

The transceiver 220 communicates data with the infrastructure facility 100. This communication is called vehicle-to-infra (V2I) communication. The transceiver 220 communicates data with other vehicles. This communication is called vehicle-to-vehicle (V2V) communication. The V2I communication and the V2V communication are collectively called vehicle-to-everything (V2X) communication. In some forms of the present disclosure, the transceiver 220 receives the data (for example, a target position, a guide route, a driving route, a command, etc.) from the infrastructure facility 100, processes the received data, and transmits the processed data to the processor 230. The transceiver 220 transmits data collected and generated by the 200 to the infrastructure facility 100. Depending on forms, the transceiver 220 communicates data with the mobile terminal of the driver of the vehicle 200.

The transceiver 220 receives and transmits the data according to a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, not limitedly, wired local area network (LAN), wired wide area network (WAN), power line communication (PLC), USB communication, Ethernet communication, serial communication, and optical/coaxial cable communication. Other protocols that support communication between devices fall within a range of communication protocols that can be used in the present disclosure.

The processor 230 controls the overall operation of the vehicle 200. The processor 230 controls the vehicle controller 240 on the basis of the data transmitted from the sensor 210 and the transceiver 220. In some forms of the present disclosure, the processor 230 generates a control signal for controlling the vehicle controller 240 on the basis of the data transmitted from the infrastructure facility 100 and transmits the control signal to the vehicle controller 240.

That is, the processor 230 refers to a device that performs a series of operations and makes determinations to control the vehicle 200 and to perform autonomous valet parking. For example, the processor 230 is a processor that operates according to a computer program consisting of instructions for performing autonomous valet parking.

The processor 230 may include a central processing unit (CPU), a micro controller unit (MCU), an application specific integrated circuit (ASIC), a field programmable gate array (FPGA) or a graphic processing unit (GPU), but not limited thereto.

The vehicle controller 240 controls the vehicle 200 according to the determinations made by the processor 230. In some forms of the present disclosure, the vehicle controller 240 controls the vehicle 200 according to the control signal transmitted from the processor 230. For example, the vehicle controller 240 controls traveling, stopping, resuming of traveling, steering, accelerating, decelerating, lighting of lamps, alarm sounding, etc.

That is, the vehicle controller 240 functions to control all kinds of operations of the vehicle 200 described herein.

On the other hand, although not described herein, the operations and/or functions of the vehicle 200 described in the description herein are performed by the conjunction of one or more components selected from among the sensor 210, the transceiver 220, the processor 230, and the vehicle controller 240. For example, the vehicle controller 240 may include a driving device, a braking device, a steering device, an accelerating device, a warning device and a lighting device.

Figure 3:
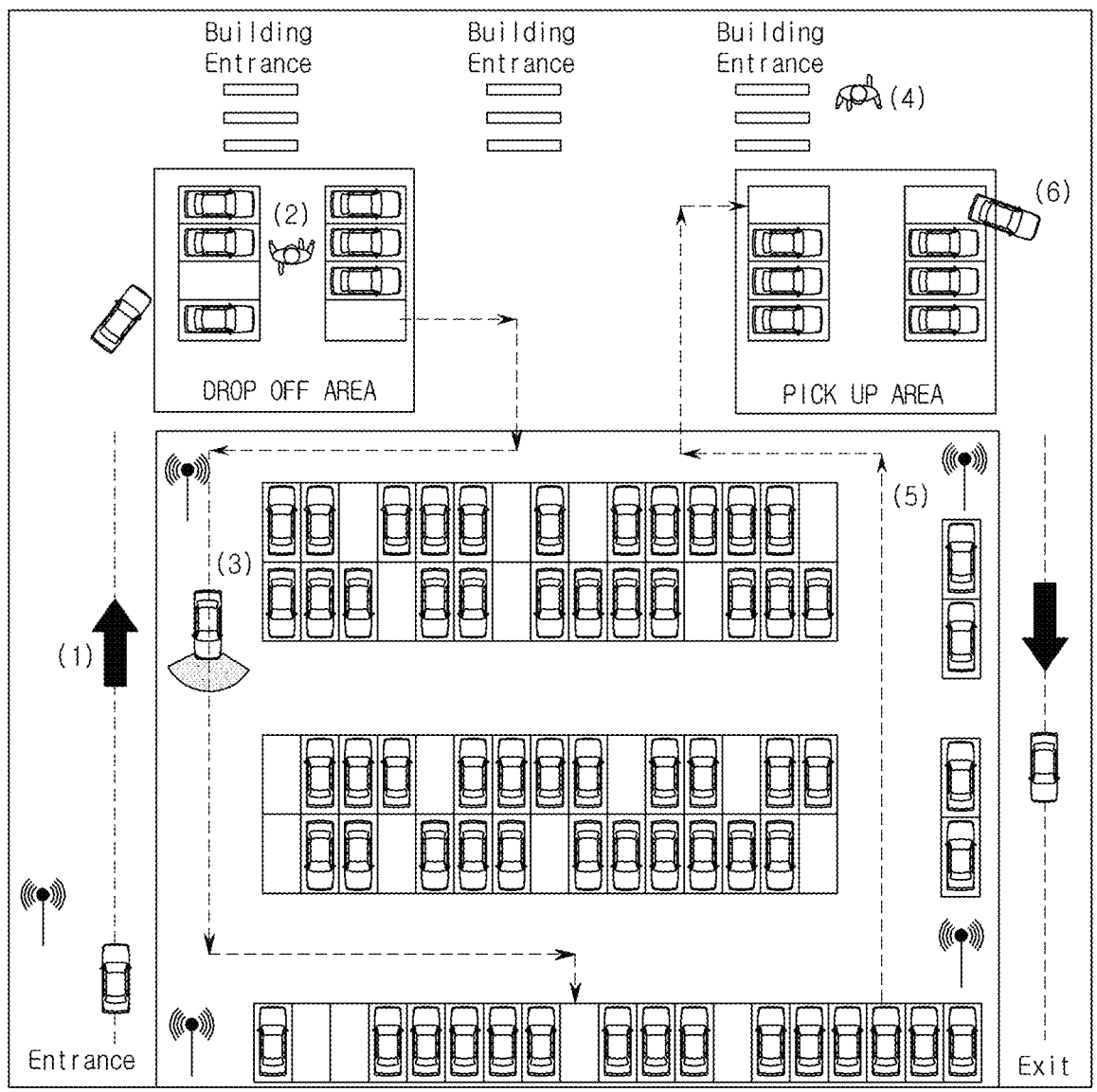
FIG. 3 is a conceptual view illustrating an automated valet parking system and method in one form of the present disclosure.

FIG. 3 is a conceptual view illustrating an automated valet parking system and an automated valet parking method in some forms of the present disclosure.

Referring to FIG. 3, in step (1), a driver drives to a drop-off area after passing through the entrance of the parking lot.

In step (2), the driver exits the vehicle at the drop-off area and the driving authority of the vehicle is delegated to the infrastructure facility.

In step (3), the infrastructure facility searches for a vacant parking slot among many parking slots in the parking lot and assigns a suitable vacant parking slot (i.e., target parking slot) to the vehicle. The infrastructure facility determines a guide route to reach the target parking slot. After the target parking slot and the guide route are determined, the vehicle autonomously travels along the guide route and performs autonomous valet parking to the target parking slot.

In step (4), when the driver wants to leave the parking lot, the driver performs a vehicle claiming process and moves to a pickup area where the driver can get the vehicle back to leave the parking lot.

In step (5), the infrastructure facility determines a target position at which the driver can conveniently get the vehicle back. For example, the target position may be a vacant parking slot within the pickup area. The infrastructure facility determines a guide route that leads the vehicle to the determined target position. After the target position and the guide route are determined, the vehicle autonomously travels along the guide route to reach the target position and performs autonomous parking to the target position.

In step (6), the driver arrives at the pickup area and takes over the driving authority for the vehicle. The driver drives the vehicle toward the exit of the parking lot.

FIGS. 4A and 4B are diagrams illustrating operations performed for automated valet parking by an infrastructure facility and a vehicle in conjunction with each other.

In step (1), an operation of initiating an automated valet parking procedure to be performed by the infrastructure facility and the vehicle is performed. The infrastructure facility identifies the driver and the vehicle and determines whether the driver and the vehicle are qualified to park in the parking lot. For example, the infrastructure facility determines whether the driver is a qualified driver by reading an identification number (ID) or a password input by the driver. The infrastructure facility determines whether the vehicle is a permitted vehicle by reading the unique number (for example, license plate number) of the vehicle. The vehicle can turn on and off the engine thereof. The vehicle can turn on and off a power supply. For example, a state in which the engine of the vehicle is turned off and the power supply is turned on is referred to as an accessory-on (ACC-On) state. The engine on/off and the power supply on/off are performed according to commands transmitted from the infrastructure facility or are automatically performed by the vehicle without depending the commands from the infrastructure facility. The vehicle can lock and unlock the door. The locking/unlocking of the vehicle door is performed according to a command transmitted from the infrastructure facility or is automatically performed without depending on the command from the infrastructure. When the vehicle proceeds to an autonomous parking step, it is preferable to lock the vehicle door. In addition, the driving authority of the vehicle is delegated from the vehicle to the infrastructure facility. The driving authority means an authority to drive and control the vehicle. The vehicle operations include steering, accelerating, braking, gear shifting, engine starting/stopping, and door locking/unlocking. After the driving authority of the vehicle is delegated to the infrastructure facility, the infrastructure facility takes complete control of the vehicle while the vehicle is performing autonomous valet parking. Accordingly, it is possible to lower the likelihood of an unintended operation of the vehicle and to prevent accidents in the parking lot. However, in some cases, the driving authority may be partially delegated to the infrastructure facility, or the driving authority may be shared by the vehicle and the infrastructure facility. For example, a braking operation needs to be performed when an emergency occurs while the autonomous valet parking is performed. Therefore, it is preferable for the vehicle to perform the braking operation without the intervention of the infrastructure facility when the vehicle detects a danger with help of an ADAS sensor. Next, the vehicle checks whether a person or animal is present in the vehicle. Since a parking duration from the completion of the autonomous valet parking to the discharging of the vehicle from the parking lot is likely to be long, if a person or animal accidently remains in the vehicle while the vehicle is parked, the person or animal would be in danger. Whether a person or an animal is present in the vehicle can be determined with a sensor mounted in the vehicle.

In step (2), an operation of determining a target position, a guide route, and a driving route is performed. The target position, the guide route, and the driving route are determined by the infrastructure facility. The target position, the guide route and the driving route determined by the infrastructure are transmitted from the infrastructure facility to the vehicle.

In step (3), an autonomous driving operation is performed in the parking lot. The autonomous driving of the vehicle includes traveling, stopping, and resuming of traveling. The vehicle performs autonomous driving according to commands transmitted from the infrastructure facility to the vehicle. Alternatively, the autonomous driving may be performed by the vehicle without relying on the commands from the infrastructure facility. The vehicle can autonomously drive to the target position along the guide route within the permitted driving area. When the vehicle performs autonomous driving, the vehicle is controlled to travel at a preset speed or below. This preset speed may be a value transmitted from the infrastructure facility to the vehicle or may be a value stored in the vehicle. In addition, the vehicle is controlled not to deviate from a preset error margin of the given guide route when traveling along the guide route. This preset error margin may be transmitted from the infrastructure facility to the vehicle or may be stored in the vehicle. In addition, the vehicle may turn with a predetermined minimum turning radius when it is necessary to curve around an obstacle (for example, at the corner) when autonomously driving along the guide route. This preset minimum turning radius may be a value transmitted from the infrastructure facility to the vehicle or may be a value stored in the vehicle. The vehicle is controlled not to exceed a predetermined maximum acceleration value when autonomously driving along the guide route. This preset maximum acceleration value may be a value transmitted from the infrastructure facility to the vehicle or may be a value stored in the vehicle.

In step (4), an operation of measuring a vehicle position is performed. The target of the position measurement may be a vehicle that is in parking operation, an obstacle existing in the parking lot, or a vehicle that is parked. The infrastructure facility measures the position of the vehicle or obstacle and stores the vehicle position in a database. The infrastructure facility identifies and detects vehicles or obstacles in the parking lot and monitors the safety of each of a plurality of vehicles. In addition, the infrastructure facility monitors the vehicle that is performing autonomous after reaching the target position and transmits a command to the vehicle. The vehicle measures its position. The vehicle transmits the measured position to the infrastructure facility. The error of the vehicle position measured by the vehicle needs to be within a predetermined error range. The predetermined error range may be a value determined by the infrastructure facility. The vehicle monitors the surroundings to detect any obstacle, measures the distance to the obstacle when the presence of the obstacle is detected, and transmits the position of the obstacle to the infrastructure facility. The frequency used for communication between the vehicle and the infrastructure facility may be a predetermined frequency.

In step (5), an autonomous parking operation is performed by the vehicle. The autonomous parking refers to an operation in which the vehicle that has reached the vicinity of the target position autonomously enters a vacant parking slot. The vehicle performs autonomous parking by sensing an obstacle or a nearby vehicle parked around the vehicle with a distance sensor mounted on the vehicle. Examples of the distance sensor mounted on the vehicle include an ultrasonic sensor, a radar sensor, a lidar sensor, and a camera.

In step (6), an emergency brake operation is performed by the vehicle. The emergency braking is performed according to a command transmitted from the infrastructure facility or may be performed by itself when the vehicle detects an obstacle. When the infrastructure facility determines that the surroundings of the vehicle are unsafe, the infrastructure facility orders the vehicle to brake immediately. When the infrastructure facility determines that the surroundings of the vehicle become safe after the emergency braking is performed, the infrastructure facility orders the vehicle to resume autonomous driving and autonomous parking. When the vehicle detects an obstacle, the vehicle may apply an emergency brake. In this case, the vehicle reports to the infrastructure facility the execution of the emergency braking or the type and position of the obstacle that is the cause of the emergency braking. The magnitude of the deceleration for the emergency braking may be a predetermined deceleration value. The predetermined deceleration value may be a value determined by the infrastructure facility or a value stored in the vehicle. The predetermined deceleration value may be determined according to the type of obstacle, the position of the obstacle, and the distance between the vehicle and the obstacle. The vehicle resumes the autonomous driving or autonomous parking upon receiving a restart command for autonomous driving or autonomous parking from the infrastructure facility. Alternatively, the vehicle may resume the autonomous driving or autonomous parking when it confirms that the obstacle is removed. The vehicle reports to the infrastructure facility the resumption of the autonomous driving or parking and the removal of the obstacle.

In step (7), the automated valet parking procedure is finished. After the autonomous driving and autonomous parking is completed, the infrastructure facility issues a control release command to the vehicle. The vehicle performs engine on/off or power on/off according to commands received from the infrastructure facility or without depending on the commands from the infrastructure facility. In addition, the vehicle can lock the vehicle doors according to commands received from the infrastructure facility or without depending on the commands from the infrastructure facility. Further, the vehicle can apply the parking brake according to commands received from the infrastructure facility or without depending on the commands from the infrastructure facility.

In step (8), an error control operation is performed. The errors to be controlled include a communication error between the vehicle and the infrastructure facility and a mechanical operation error of the vehicle. The infrastructure facility monitors communication with the vehicle to detect whether a communication error occurs. The vehicle monitors communication with the infrastructure facility to detect whether a communication error occurs. The vehicle checks whether a mechanical operation error occurs by monitoring operating states of accessories including sensors mounted thereon. The vehicle checks whether a human or an animal exists inside the vehicle and applies an emergency brake when it is confirmed that a human or an animal exists inside the vehicle. The vehicle resumes the autonomous parking or autonomous driving upon receiving a command from the infrastructure facility when it is in an emergency stop state. Alternatively, the vehicle may check whether the cause of the emergency stop is removed and resume the autonomous parking or autonomous driving when it is confirmed that the cause of the emergency stop is removed.

FIG. 5 is a diagram illustrating communication between an infrastructure facility and a vehicle that work in conjunction with each other to perform automated valet parking.

In step (1), vehicle qualification information is delivered from the vehicle to the infrastructure facility. The vehicle qualification information includes an identifier that can distinguish each vehicle from other vehicles. For example, the vehicle qualification information may be a unique number (for example, license plate number) of the vehicle. The vehicle qualification information is transmitted at a stage in which the vehicle enters the parking lot and the autonomous valet parking procedure is started (see (1) of FIG. 2A).

In step (2), an autonomous valet parking preparation command is transmitted from the infrastructure facility to the vehicle. The autonomous valet parking preparation command is sent to the vehicle before the autonomous driving of the vehicle begins.

In step (3), vehicle information is transmitted from the vehicle to the infrastructure facility. The vehicle information includes state information of the vehicle and position information of the vehicle. The state information of the vehicle includes whether the vehicle is running, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure facility. For example, when the vehicle information is not received by the infrastructure facility at a predetermined time which is set according to the specific communication frequency, the infrastructure facility determines that an error has occurred in communication between the vehicle and the infrastructure facility.

In step (4) an acknowledgement of the reception of the vehicle information is transmitted from the infrastructure facility to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure facility. For example, when the acknowledgement of the reception of the vehicle information does not reach the vehicle at a predetermined time which is estimated according to the communication frequency, the vehicle determines that an error has occurred in communication between the vehicle and the infrastructure facility.

In step (5) a target position and a guide route are transmitted from the infrastructure facility to the vehicle. The transmission of the target position and the guide route is performed either before or after the autonomous valet parking start command is transmitted from the infrastructure facility to the vehicle.

In step (6), a driving boundary is transmitted from the infrastructure facility to the vehicle. The driving boundary may include landmarks (for example, parking lines, center lines, road boundary lines) by which a permitted driving area is bounded. The transmission of the driving boundary is performed after the autonomous valet parking preparation command is delivered. This driving boundary is transmitted from the infrastructure facility to the vehicle in the form of a parking lot map.

In step (7), an autonomous valet parking start command is transmitted from the infrastructure facility to the vehicle. The transmission of the autonomous valet parking start command is performed after the guide route and the driving boundary are delivered. Alternatively, the autonomous valet parking start command may be transmitted after the safety of the vehicle is confirmed in a case where the vehicle is in an emergency stop state.

In step (8), an emergency braking command is transmitted from the infrastructure facility to the vehicle.

In step (9), a vehicle control release command is transmitted from the infrastructure facility to the vehicle. The transmission of the vehicle control release command is performed after the vehicle is autonomously parked in a parking slot.

Figure 6:
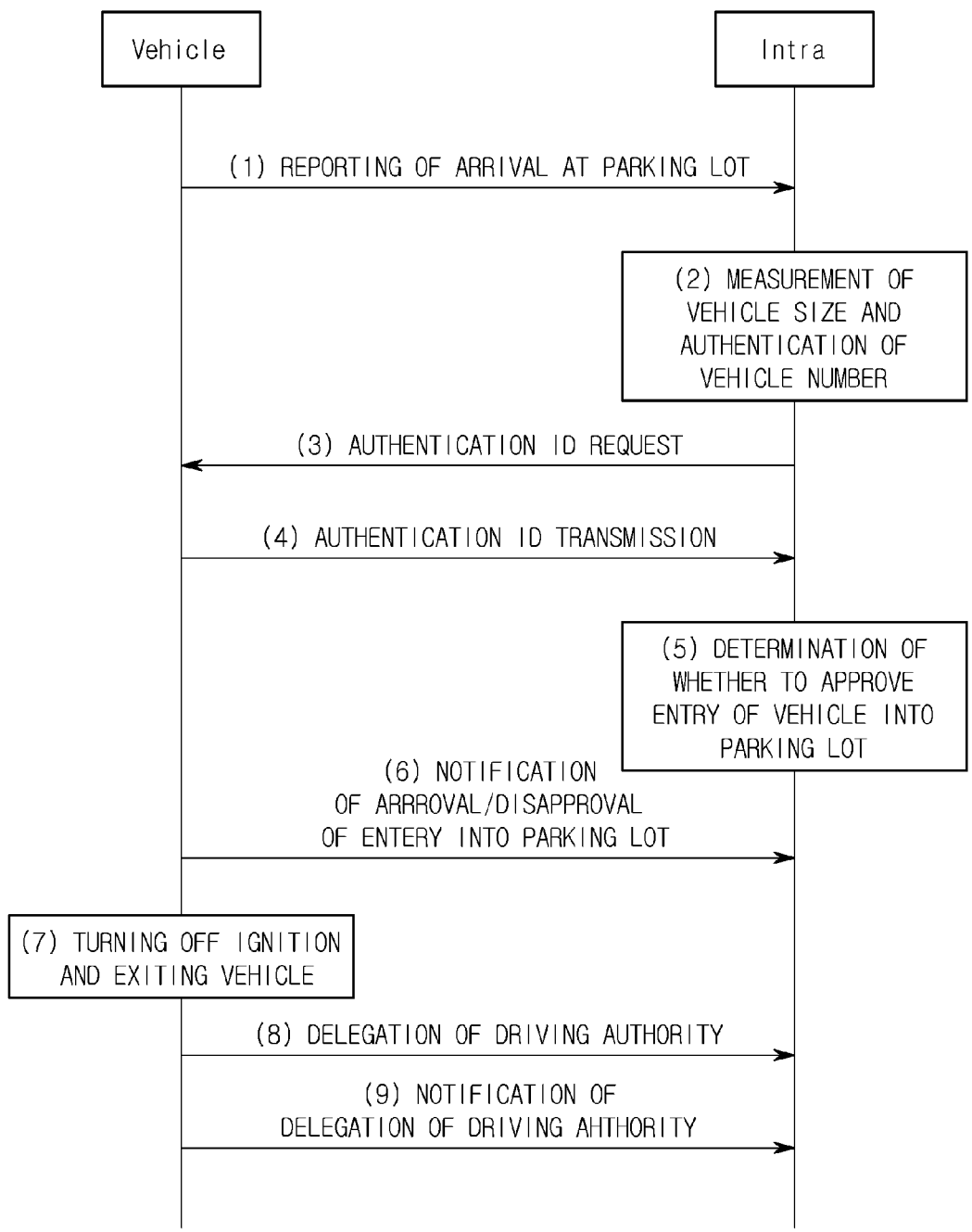
FIG. 6 is a view illustrating a communication process performed by an automated valet parking infrastructure and a vehicle in one form of the present disclosure.

FIG. 6 is a diagram illustrating a communication process performed between an automated valet parking apparatus and a vehicle in some forms of the present disclosure.

In step (1), a vehicle 200 enters a parking lot passageway and stops at a stop position. This stop position may be a parking lot entrance gate. The vehicle 200 reports to the infrastructure facility 100 that it has arrived at the stop position. In step (2), the infrastructure facility 100 measures the size of the vehicle 200 and authenticates the vehicle 200 with a vehicle number (i.e., license plate number). In step (3), the infrastructure facility 100 transmits an authentication ID request to the vehicle 200. In step (4), the vehicle 200 transmits an authentication ID to the infrastructure facility 100. In step (5), the infrastructure facility 100 determines approval or disapproval of the entry of the vehicle into the parking lot on the basis of the received authentication ID. In step (6), the infrastructure facility 100 notifies the vehicle of the approval or disapproval on the basis of the received authentication ID. For example, the infrastructure 100 displays a message of approval or disapproval on a display panel disposed around the stop position. The driver of the vehicle 200 moves the vehicle 200 to a drop-off area when the entry of the vehicle into the parking lot is approved. In step (7), the driver turns off the engine of the vehicle 200, gets off the vehicle 200, and leaves the drop-off area after locking the door of the vehicle 200. In step (8), the authority to drive and control the vehicle 200 is delegated from the vehicle 200 (or driver) to the infrastructure facility 100. In step (9), the infrastructure facility 100 notifies the driver that the authority to drive or control the vehicle 200 is delegated thereto. Such notification may be sent to the driver's smart device via a mobile communication network.

Figure 7:
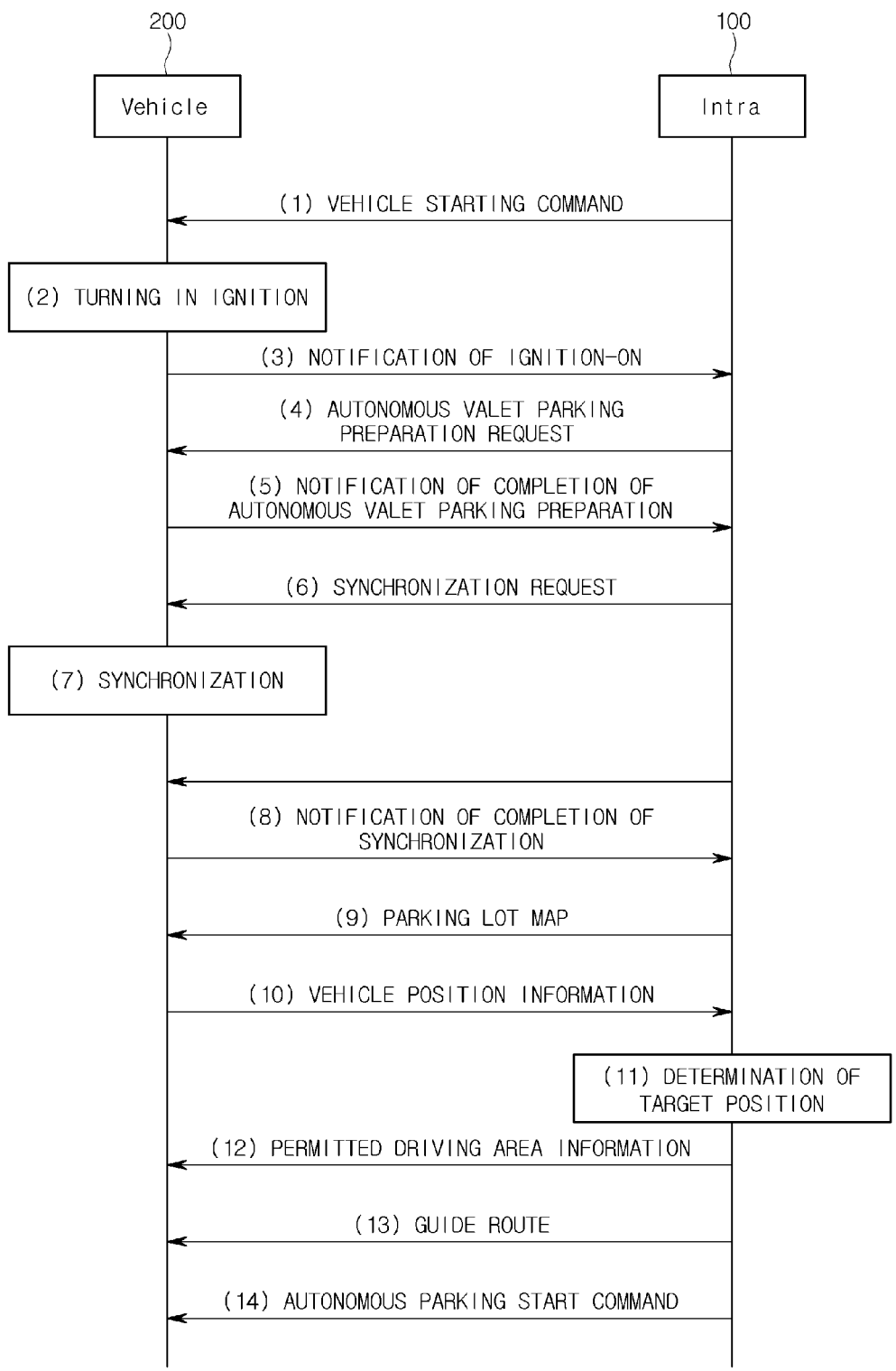
FIG. 7 is a view illustrating a communication process performed by an automated valet parking infrastructure and a vehicle in one form of the present disclosure.

FIG. 7 is a diagram illustrating a communication process performed between an automated valet parking apparatus and a vehicle in some forms of the present disclosure.

In step (1), the infrastructure facility 100 transmits an engine starting request to the vehicle 200. In step (2), the vehicle 200 turns on the engine of the vehicle 200 in response to the engine starting request transmitted from the infrastructure facility 100. In step (3), the vehicle 200 notifies the infrastructure facility 100 that the engine of the vehicle is turned on after turning on the engine. In step (4), the infrastructure facility 100 transmits an autonomous valet parking preparation request to the vehicle 200. In step (5), the vehicle 200 transmits a reply to the automated valet parking preparation request to the infrastructure facility 100. The reply is a message of OK indicating that the preparation for automated valet parking is completed or a message of NG indicating that the preparation for automated valet parking is not completed. In step (6), the infrastructure facility 100 transmits a synchronization request to vehicle 200. The synchronization request is a request for instructing synchronization of the time such that the timer of the infrastructure facility 100 is synchronized with the timer of the vehicle 200. For example, the synchronization request may include information about time of the infrastructure facility 100. In step (7), the vehicle 200 performs the synchronization according to the synchronization request. In step (8), the vehicle 200 transmits a reply indicating that the synchronization is completed to the infrastructure facility 100. For example, until the synchronization between the infrastructure facility 100 and the vehicle 200 is completed, a plurality of synchronization requests may be transmitted from the infrastructure facility 100 to the vehicle 200. In step (9), the infrastructure facility 100 transmits parking lot map information to vehicle 200. The parking lot map information includes landmark information. In step (10), the vehicle 200 estimates (or calculates) the position of the vehicle 200 on the basis of the transmitted landmark information, and the vehicle 200 transmits the estimated position of the vehicle 200 to the infrastructure facility 100. In step (11), the infrastructure facility 100 determines a target position (target parking position). In step (12), the infrastructure facility 100 transmits information on a permitted driving area to the vehicle 200. For example, the infrastructure facility 100 transmits boundary information of the permitted driving area to the vehicle 200. In step (13), the infrastructure facility 100 transmits a guide route to the vehicle 200. In step (14), the infrastructure facility 100 transmits an autonomous valet parking start command to the vehicle 200.

Figure 8:
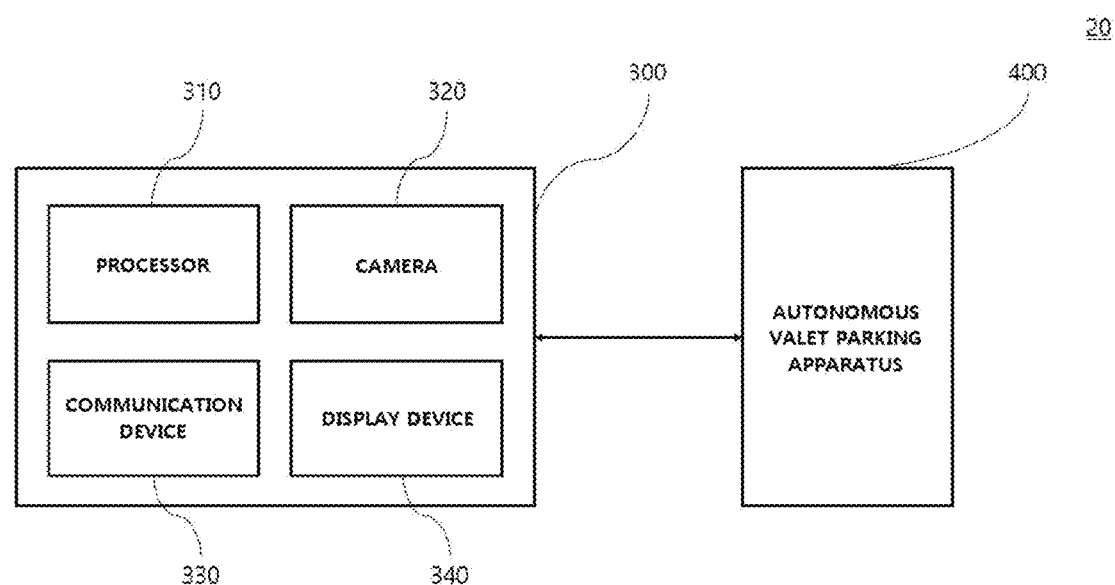
FIG. 8 is a view illustrating an automated valet parking system in one form of the present disclosure.

FIG. 8 is a block diagram illustrating an automated valet parking system in some forms of the present disclosure. Referring to FIGS. 1 to 8, an autonomous valet parking system 20 includes an infrastructure facility 300 and an autonomous valet parking apparatus 400.

The infrastructure 300 and the autonomous valet parking apparatus 400 illustrated in FIG. 8 perform the functions of the infrastructure 100 and the autonomous valet parking apparatus 200 illustrated in FIG. 1, respectively. Therefore, only additional functions or differences will be described when describing the infrastructure facility 300 and the autonomous valet parking apparatus 400.

The infrastructure facility 300 refers to a facility or system for operating, managing, and controlling an automated valet parking system.

In some forms of the present disclosure, the infrastructure 300 may include a processor 310, a camera 320, a communication device 330, and an output device 340.

The processor 310 controls the overall operation of the infrastructure facility 300. In some forms of the present disclosure, the processor 310 controls operations of the camera 320, the communication device 330, and the display device 340.

The processor 310 may be a device having a computing function. That is, the processor 310 performs various computations and determinations required to perform the operation or function of the infrastructure facility 300 described herein, and outputs the computation or determination results to the corresponding parts of the infrastructure facility 300. Examples of the processor 310 include a central processing unit (CPU), a micro controller unit (MCU), a microprocessor unit (MPU), a floating point unit (FPU), a digital signal processor (DSP), a programmable logic circuit, a field programmable gate array (FPGA), and a programmable logic array (PLA).

The camera 320 captures an image of the autonomous valet parking apparatus 400 and its surroundings. In some forms of the present disclosure, the camera 400 means an arbitrary device that photographs a subjects to generate still images or moving images. Examples of the camera 400 include a still image camera, a video camera, a closed circuit television (CCTV), a camcorder, a camera built in a mobile device, a camera built in a vehicle, and a camera built in a laptop or a computer.

The infrastructure facility 300 obtains a vehicle ID to identify the autonomous valet parking apparatus 400 with the use of the camera 320. In some forms of the present disclosure, the camera 320 photographs the license plate attached to the autonomous valet parking apparatus 400, generate an image according to the photographing result, and transmits the generated image to the processor 310. The processor 310 obtains a vehicle ID to identify the autonomous valet parking apparatus 400 from the image of the autonomous valet parking apparatus 400. The vehicle ID may be a vehicle number of the autonomous valet parking apparatus 400. In addition, the camera 320 analyzes the generated image and acquires a vehicle ID to identify the autonomous valet parking apparatus 400 from the analysis result.

The communication device 330 communicates with the autonomous valet parking apparatus 400. In some forms of the present disclosure, the communication device 330 exchanges data with the autonomous valet parking apparatus 400.

As will be described later, the communication device 330 may transmit the vehicle ID obtained by the processor 310 to the autonomous valet parking apparatus 400, and receive a communication ID for establishing communication from the autonomous valet parking apparatus 400. For example, the vehicle ID and the communication ID may be transmitted according to a Bluetooth communication scheme.

The communication ID may be an identifier used to perform communication with the autonomous valet parking apparatus 400. For example, the communication ID may be a media access control (MAC) address, an internet protocol (IP) address, a connection ID (CID), or an international mobile equipment identity (IMEI) of the autonomous valet parking apparatus 400, but is not limited thereto. That is, it is any data for specifying the autonomous valet parking apparatus 400 on a communication network.

In some forms of the present disclosure, the communication device 330 includes a Bluetooth communication module to transmit the vehicle ID according to the broadcasting mode (or the advertising mode) of the Bluetooth communication scheme. The broadcasting mode refers to a mode in which a signal is transmitted to arbitrary devices without specifying a reception target. The Bluetooth communication module of the communication device 330 is initially in an idle state and enters a power-on state when receiving the vehicle ID from the processor 310 or the camera 320. In the power-on state, the vehicle ID can be transmitted. That is, the Bluetooth module of the communication device 330 recognizes the vehicle ID as an interrupter.

Thereafter, the communication device 330 receives the communication ID from the autonomous valet parking apparatus 400 provided with the vehicle ID according to the connection mode of the Bluetooth communication scheme. The connection mode refers to a mode in which a signal is transmitted to a specified reception target.

The communication device 330 establishes communication with the autonomous valet parking apparatus 400 on the basis of the received communication ID. In some forms of the present disclosure, after the communication between the infrastructure facility 300 and the autonomous valet parking apparatus 400 is established, the driving authority of the autonomous valet parking apparatus 400 is delegated to the communication device 330, and a target position and a guide route are transmitted to the autonomous valet parking apparatus 400.

The output device 340 refers to a device capable of outputting a visual or audible signal. For example, the display device 340 may be a display device, a speaker, or a lamp.

The output device 340 may display data transmitted from the processor 310. In some forms of the present disclosure, the output device 340 may display information to be provided to the driver of the autonomous valet parking apparatus 400. For example, the output device 340 may display a message asking the driver of the autonomous valet parking device 400 whether to perform autonomous valet parking.

The output device 340 is provided in the infrastructure facility 100.

Figure 9:
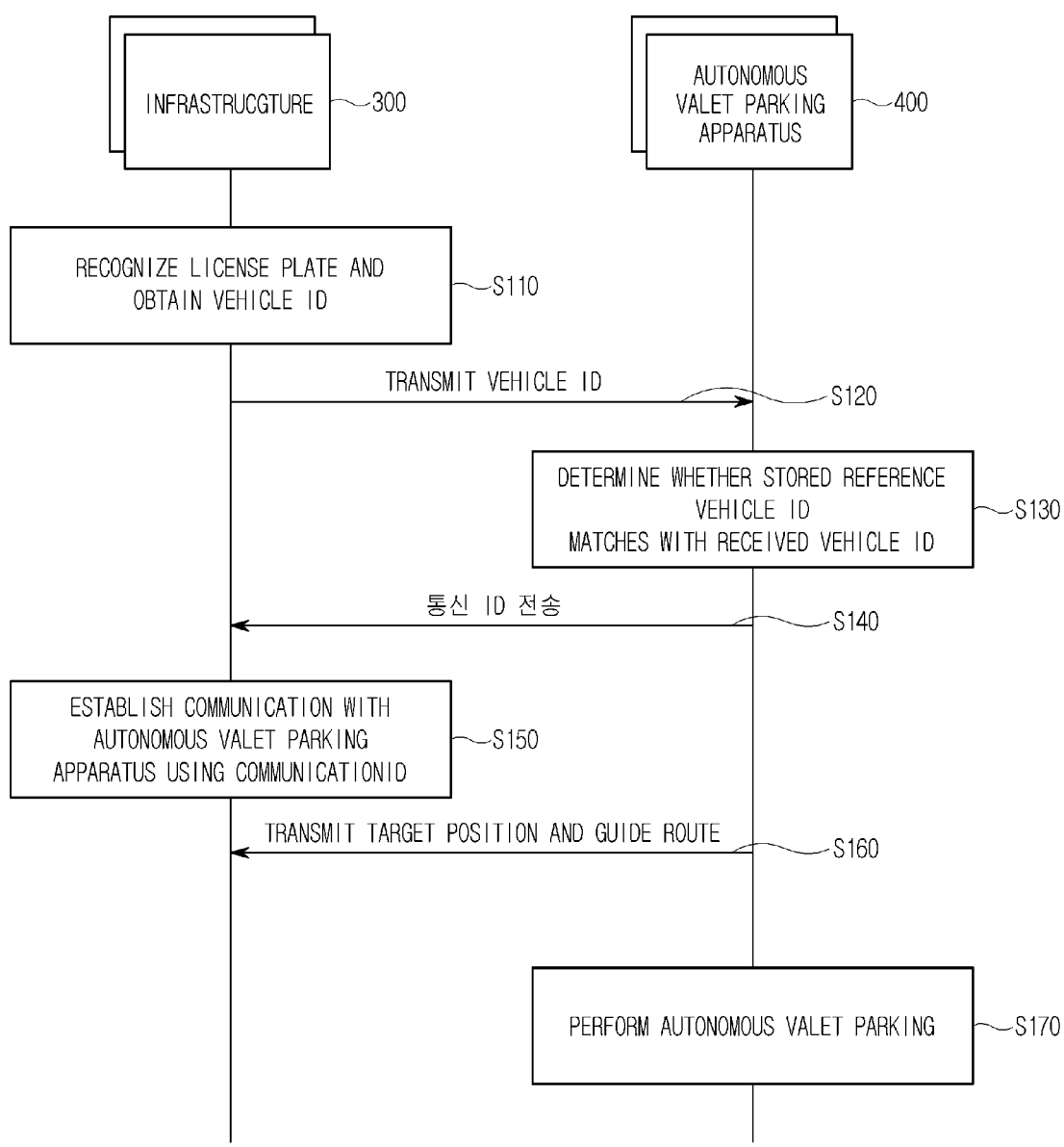
FIG. 9 is a data flowchart for an automated valet parking system in one form of the present disclosure.

FIG. 9 is a data flowchart for an automated valet parking system in some forms of the present disclosure. Referring to FIGS. 1 to 9, the infrastructure facility 300 takes a picture of the autonomous valet parking apparatus 400, and obtains the vehicle ID Of the autonomous valet parking apparatus 400 by identifying and recognizing the vehicle license plate in step S110.

The infrastructure facility 300 transmits the vehicle ID to the autonomous valet parking apparatus 400 through the communication device 330 in step S120. In some forms of the present disclosure, the infrastructure facility 300 transmits the vehicle ID in the broadcasting mode of the Bluetooth communication scheme.

The autonomous valet parking apparatus 400 receives the vehicle ID and determines whether the received vehicle ID and a stored reference vehicle ID are the same in step S130.

When the received vehicle ID and the stored reference vehicle ID match, the autonomous valet parking apparatus 400 transmits the communication ID to the infrastructure facility 300 in step S140. In some forms of the present disclosure, when the received vehicle ID and the stored reference vehicle ID are the same, the autonomous valet parking apparatus 400 provides (or displays) a message for asking the driver whether to use an automated valet parking service, and transmits a communication ID when the driver wants to use the automated valet parking service.

That is, the autonomous valet parking apparatus 400 checks whether the infrastructure facility with which communication is to be established matches the infrastructure facility 300 inside which the automated valet parking apparatus 400 is located. When matched, the communication ID is transmitted. That is, authentication based on the vehicle ID is performed in advance between the infrastructure facility 300 and the autonomous valet parking apparatus 400.

The autonomous valet parking apparatus 400 may transmit the communication ID to the infrastructure facility 300 according to the connection mode of the Bluetooth communication scheme. In some forms of the present disclosure, the autonomous valet parking apparatus 400 receives a vehicle ID from the infrastructure facility 300, performs Bluetooth pairing with the infrastructure facility 300, and transmits the communication ID according to the connection mode of the Bluetooth communication scheme. For example, when the autonomous valet parking apparatus 400 receives the vehicle ID from the infrastructure facility 300, the autonomous valet parking apparatus 400 also receives the ID of the infrastructure facility 300 (or the communication device 330) and uses the ID of the infrastructure facility 300 for Bluetooth pairing.

The infrastructure facility 300 establishes communication with the autonomous valet parking apparatus 400 to perform automated valet parking on the basis of the received communication ID in step S150. In some forms of the present disclosure, the infrastructure facility 300 transmits a signal to the autonomous valet parking apparatus 400 over a network using the communication ID, and receives a reply to the signal from the autonomous valet parking apparatus 400, thereby establishing communication with the autonomous valet parking apparatus 400.

In some forms of the present disclosure, the infrastructure facility 300 establishes communication with the autonomous valet parking apparatus 400 according to a communication protocol different from the communication protocol through which the vehicle ID and the communication ID are transmitted. That is, the infrastructure facility 300 may communicate with the autonomous valet parking apparatus 400 according to different communication protocols before and after receiving the communication ID, respectively.

Therefore, in some forms of the present disclosure, the autonomous valet parking system 10 perform authentication between the infrastructure facility 300 and the autonomous valet parking apparatus 400 using the vehicle ID. After the authentication process, the autonomous valet parking apparatus 400 transmits the communication ID to the infrastructure facility 300 so that communication between the infrastructure facility 300 and the autonomous valet parking apparatus 400 is established.

Meanwhile, before establishing communication, the infrastructure facility 300 determines whether the autonomous valet parking apparatus 400 is located in the drop-off area. When it is determined that the autonomous valet parking apparatus 400 is located in the drop-off area, the infrastructure facility 300 establishes communication with the autonomous valet parking apparatus 400. In some forms of the present disclosure, the infrastructure facility 300 recognizes the vehicle license plate of the autonomous valet parking apparatus 400 and continuously tracks the autonomous valet parking apparatus 400, thereby identifying the position of the autonomous valet parking apparatus 400 in real time. Through this real-time tracking, it is possible to determine whether the autonomous valet parking apparatus 400 is located in the drop-off area.

The state in which the autonomous valet parking apparatus 400 is located in the drop-area is the condition to start an autonomous valet parking procedure. In addition, the infrastructure facility 300 provides a message to the driver of the autonomous valet parking apparatus 400, in which the message is a question to ask whether the driver of the autonomous valet parking apparatus 400 wants to use an autonomous valet parking function. Next, the infrastructure facility 300 establishes communication with the autonomous valet parking apparatus 400 at the request of the driver.

For example, the infrastructure facility 300 may display the message of asking whether to execute the autonomous valet parking to the driver on the display device 340 disposed around the autonomous valet parking apparatus 400 on the basis of the identified position of the autonomous valet parking apparatus 400.

After communication between the autonomous valet parking apparatus 400 and the infrastructure facility 300 is established, the infrastructure facility 300 transmits a target position and a guide route to the autonomous valet parking apparatus 400 in step S160. In some forms of the present disclosure, the infrastructure facility 300 transmits the target position and the guide route to the address of the autonomous valet parking apparatus 400 included in the communication ID. For example, the infrastructure facility 300 transmits the target position and the guide route according to a method other than the Bluetooth communication method.

The autonomous valet parking apparatus 400 may perform autonomous valet parking on the basis of the target position and the guide route transmitted from the infrastructure facility 300 in step S170.

In some forms of the present disclosure, the described functions are implemented in hardware, software, firmware, or any combination thereof. When the functions are implemented in software, these functions are stored in or transmitted over a computer-readable medium in the form of one or more instructions or code. The computer-readable medium refers to any medium that can transfer a computer program from one computer to another. For example, it may be a communication medium or a computer-readable storage medium. The storage medium may be an arbitrary medium that can be accessed by a computer. Examples of the computer-readable recording medium include, not limitedly, RAM, ROM, EEPROM, optical disk storages such as CD-ROM, magnetic disk storages, and any media that can be used to transfer a computer program in the form of commands or data structures and which can be accessed by a computer. The computer-readable medium can be appropriately referred to as a medium that can be arbitrarily accessed by a computer. For example, when software is transmitted from a website, server or other remote source through coaxial cable, fiber optic cable, a twisted pair cable, digital subscriber line (DSL), or wireless technology using infrared, radio, or ultrahigh frequency, the coaxial cable, fiber optic cable, twisted pair cable, DL, and wireless technology, twisted pair, DSL, or wireless technology using infrared, radio, and ultrahigh frequency fall within the definition of the medium. The discs and disks used herein include compact discs (CDs), laser discs, optical discs, digital general purpose discs (DVDs), floppy disks and Blu-ray discs. Discs generally refer to media from which data is optically read and disks refer to media from which data is magnetically read. Combinations of the above-mentioned media also fall within the definition of the computer-readable media.

When some forms of the present disclosure are implemented as program code or code segments, the code segment may represent a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent or transmitted using any suitable means such as memory sharing, message delivery, token delivery, network transmission, and the like. In addition, in some aspects, steps and/or operations of a method or algorithm may reside on a machine-readable medium and/or a computer-readable medium in the form of a combination or set of one or more codes and/or one or more instructions that can be integrated into a computer program product.

When implemented in software, the techniques described herein may be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented in hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-described ones include one or more forms of the present disclosure. Of course, the above-described forms do not cover all possible combinations of components and/or methods to implement the present disclosure. Thus, those skilled in the art will appreciate that many further combinations and substitutions of components and/or methods in various forms are possible. Accordingly, the described forms of the present disclosure are intended to cover all such alterations, modifications and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inferencing" generally refers to a process of determining or inferring a state of a system, environment, and/or user from a set of observations of events and/or data. Inferencing can be used to identify a specific situation or action, or can generate a probability distribution of certain states, for example. Inferencing is probabilistic. That is, inferencing may mean a calculation of a probability distribution of those states, based on study on data and events Inferencing may involve techniques used to construct a higher level event from a set of events and/or data. The inferencing refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, but not limitedly, hardware, firmware, any combination of hardware and software, software, or a computer entity associated with software being executed therein. For example, the term "component" may refer to, but not limitedly, a process running on a processor, a processor, an object, an executable thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automated valet parking method performed by a vehicle, the method comprising:
   establishing a communication with an infrastructure facility;
   receiving a target position and a guide route from the infrastructure facility after the communication is established;
   receiving commands related to autonomous driving from the infrastructure facility;
   performing an autonomous driving based on the guide route;
   performing an autonomous parking at the target position;

transmitting a notification that the autonomous parking is completed to the infrastructure facility; and receiving control release command from the infrastructure facility, wherein a driving authority of the vehicle is transferred to the infrastructure facility after the communication is established, and wherein the driving authority of the vehicle is returned to the vehicle by the control release command.

2. The method of claim 1, wherein establishing the communication comprises:

receiving a vehicle identification (ID) from the infrastructure facility;

transmitting a communication identification (ID) in response to the vehicle ID; and communicating with the infrastructure facility based on the communication ID, wherein the vehicle ID comprises a vehicle number, and wherein the communication ID comprises a media access control (MAC) address, an internet protocol (IP) address, a connection ID (CID), or an international mobile equipment identity (IMEI) of the vehicle.

3. The method of claim 2, wherein transmitting the communication ID comprises:

comparing the received vehicle ID with a stored reference vehicle ID; and transmitting the communication ID to the infrastructure facility when the received vehicle ID and the stored reference ID match.

4. The method of claim 3, wherein transmitting the communication ID to the infrastructure facility comprises:

requesting a driver to approve an autonomous valet parking when the received vehicle ID and the stored reference vehicle ID match; and transmitting the communication ID when the autonomous valet parking is approved.

5. The method of claim 2, wherein the method further comprises:

transmitting the vehicle ID in a broadcasting mode through a wireless communication; and transmitting the communication ID in a connection mode through the wireless communication.

6. The method of claim 2, wherein the method further comprises:

guiding the vehicle from a stop position to the target position through the guide route; and identifying, by a camera included in the infrastructure facility, the stop position of the vehicle.

7. The method of claim 1, wherein when the vehicle performs the autonomous driving, the vehicle is controlled to travel at a present speed or below and the preset speed is a value transmitted from the infrastructure facility.

8. The method of claim 1, wherein the driving authority is configured to control operations of the vehicle, including steering, accelerating, braking, gear shifting, engine starting, engine stopping, door locking, and door unlocking.

9. An automated valet parking method performed by an infrastructure facility, the method comprising:

establishing a communication with a vehicle;

obtaining driving authority of the vehicle after establishing the communication;

transmitting a target position and a guide route to the vehicle after the communication is established;

transmitting commands related to the autonomous driving to the vehicle;

receiving a notification that an autonomous valet parking is completed from the vehicle after the vehicle is parked at the target position based on the guide route; and transmitting control release command to the vehicle to return the driving authority of the vehicle.

10. The method of claim 9, wherein establishing the communication with the vehicle comprises:

transmitting a vehicle identification (ID) to the vehicle;

receiving a communication identification (ID) from the vehicle; and communicating, by the infrastructure facility, with the vehicle based on the communication ID, wherein the vehicle ID comprises a vehicle number, and wherein the communication ID comprises a media access control (MAC) address, an internet protocol (IP) address, a connection ID (CID), or an international mobile equipment identity (IMEI) of the vehicle.

11. The method of claim 10, wherein transmitting the vehicle ID comprises:

capturing an image of the vehicle to obtain the vehicle ID when the vehicle enters the infrastructure facility; and transmitting the obtained vehicle ID to the vehicle.

12. The method of claim 10, wherein communicating with the vehicle comprises:

determining whether the vehicle is in a drop off area; and communicating with the vehicle using the communication ID when the vehicle is located in the drop-off area.

13. The method of claim 12, wherein determining whether the vehicle is in the drop-off area comprises:

capturing an image of the vehicle to obtain the vehicle ID when the vehicle enters the infrastructure facility;

identifying a position of the vehicle in real time by continuously tracking the vehicle after the vehicle ID is obtained; and determining whether the vehicle is in the drop-off area based on the position of the vehicle.

14. The method of claim 10, wherein the vehicle ID is transmitted in a broadcasting mode through a wireless communication; and wherein the communication ID is received in a connection mode through the wireless communication.

15. The method of claim 9, wherein the method further comprises:

transmitting a preset speed to the vehicle to control the vehicle to autonomously drive at the preset speed or below.

16. The method of claim 15, wherein the driving authority is configured to control operations of the vehicle, including steering, accelerating, braking, gear shifting, engine starting, engine stopping, door locking, and door unlocking.

17. A non-transitory computer-readable recording medium having a program recorded thereon, the program to direct a processor to perform acts of:

establishing, by an infrastructure facility comprising the processor and a transceiver, a communication with a vehicle;

obtaining, by the infrastructure facility, driving authority of the vehicle after establishing the communication;

transmitting, by the infrastructure facility, a target position and a guide route to the vehicle after the communication is established;

transmitting, by the infrastructure facility, commands related to the autonomous driving to the vehicle;

receiving, by the infrastructure facility, a notification that an autonomous valet parking is completed from the vehicle after the vehicle is parked at the target position based on the guide route; and transmitting, by the infrastructure facility, a control release command to the vehicle to return the driving authority of the vehicle.

* * * * *